US009890926B2

(12) United States Patent
Preston et al.

(10) Patent No.: US 9,890,926 B2
(45) Date of Patent: Feb. 13, 2018

(54) LOW PROFILE MULTI-LENS TIR

(71) Applicant: FRAEN CORPORATION, Reading, MA (US)

(72) Inventors: James Preston, Malden, MA (US); Brien Housand, Worcester, MA (US); Michael Zollers, Burlington, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 13/955,839

(22) Filed: Jul. 31, 2013

(65) Prior Publication Data

US 2014/0036510 A1    Feb. 6, 2014

Related U.S. Application Data

(60) Provisional application No. 61/678,781, filed on Aug. 2, 2012, provisional application No. 61/809,631, filed on Apr. 8, 2013.

(51) Int. Cl.
*F21V 7/00* (2006.01)
*F21V 13/04* (2006.01)
(Continued)

(52) U.S. Cl.
CPC ............ *F21V 7/0091* (2013.01); *F21V 5/008* (2013.01); *F21V 13/04* (2013.01); *F21V 17/002* (2013.01);
(Continued)

(58) Field of Classification Search
CPC .......... G02B 3/08; G02B 3/0043; G02B 3/04; G02B 3/0062; G02B 3/0068;
(Continued)

(56) References Cited

U.S. PATENT DOCUMENTS 2,246,098 A    6/1941   Jaeckel
3,283,653 A   11/1966   Tokarzweski
(Continued)

FOREIGN PATENT DOCUMENTS

CN    101995592 A    3/2011
JP    2010500708 A   1/2010
(Continued)

OTHER PUBLICATIONS

International Search Report, PCT/US2013/052964, dated Dec. 2, 2013 (6 pages.).
(Continued)

*Primary Examiner* — Bryon T Gyllstrom
*Assistant Examiner* — James Endo
(74) *Attorney, Agent, or Firm* — Reza Mollaaghababa; Thomas J. Engellenner; Pepper Hamilton LLP

(57) ABSTRACT

In one aspect, an optical lens assembly (herein referred to also as an optic) is provided that comprises a plurality of lenses (or lens segments) adapted to receive light from a light source, each of said lenses (or lens segments) having an input surface and an output surface and a lateral surface extending between the input and output surfaces. The lenses are arranged relative to one another and positioned relative to the light source such that each of the lenses receives at its input surface a different portion of light emitted by the source, e.g., each lens receives at its input surface light emitted by the source into an angular subtense (solid angle) different than an angular subtense associated with another lens. Each lens (or lens segment) guides at least a portion of the received light to its output surface via reflection, e.g., via total internal reflection (TIR).

27 Claims, 15 Drawing Sheets

(51) Int. Cl.
*G02B 5/09* (2006.01)
*F21V 17/00* (2006.01)
*G02B 19/00* (2006.01)
*F21V 5/00* (2015.01)

(52) U.S. Cl.
CPC ............ *G02B 5/09* (2013.01); *G02B 19/0028* (2013.01); *G02B 19/0061* (2013.01); *F21V 5/004* (2013.01); *G02B 19/0019* (2013.01); *G02B 19/0023* (2013.01)

(58) Field of Classification Search
CPC .............. G02B 17/006; G02B 19/0028; G02B 19/0019; G02B 19/0023; G02B 5/09; F21V 5/046; F21V 7/0091; F21V 7/0033; F21V 17/002; F21V 5/008; F21V 13/04; F21V 13/02
USPC ........... 362/311.02, 309, 332, 331, 304, 305, 362/321, 521, 522, 336, 311.1, 329; 385/93
See application file for complete search history.

(56) References Cited

U.S. PATENT DOCUMENTS

| | | | | |
|---|---|---|---|---|
| 4,900,914 A * | 2/1990 | Raff et al. ...................... | 250/216 |
| 5,075,797 A * | 12/1991 | Jones ............................ | 359/350 |
| 5,394,317 A * | 2/1995 | Grenga et al. ................. | 362/347 |
| 5,813,743 A * | 9/1998 | Naka ................... | F21S 48/1329 362/16 |
| 5,926,320 A * | 7/1999 | Parkyn, Jr. .......... | F21S 48/1329 359/618 |
| 6,961,190 B1 * | 11/2005 | Tamaoki ................ | B43K 29/10 257/E25.021 |
| 7,123,419 B1 * | 10/2006 | Simon ........................... | 359/641 |
| 7,378,686 B2 * | 5/2008 | Beeson et al. ................. | 257/100 |
| 7,901,108 B2 * | 3/2011 | Kabuki ............... | G02B 6/0018 362/235 |
| 7,918,583 B2 * | 4/2011 | Chakmakjian et al. ...... | 362/240 |
| 8,246,197 B2 * | 8/2012 | Huang ........................... | 362/235 |
| 8,403,530 B2 * | 3/2013 | Singer et al. ................. | 362/243 |
| 8,641,238 B2 * | 2/2014 | Chiu et al. .................... | 362/335 |
| 2004/0080835 A1 * | 4/2004 | Chinniah ............ | F21S 48/2212 359/708 |
| 2005/0201118 A1 * | 9/2005 | Godo ........................ | F21V 5/04 362/555 |
| 2006/0044806 A1 * | 3/2006 | Abramov et al. ............. | 362/337 |
| 2007/0139932 A1 * | 6/2007 | Sun et al. ...................... | 362/331 |
| 2008/0037116 A1 * | 2/2008 | Alasaarela et al. ........... | 359/433 |
| 2009/0174954 A1 * | 7/2009 | Hara ...................... | G02B 7/021 359/819 |
| 2009/0207614 A1 | 8/2009 | Cheng et al. | |
| 2009/0273933 A1 * | 11/2009 | Woodward ............ | F21V 7/0091 362/297 |
| 2009/0296049 A1 * | 12/2009 | Teradaira et al. ............... | 353/98 |
| 2009/0304333 A1 * | 12/2009 | Whitty ................... | G02B 7/021 385/52 |
| 2010/0157434 A1 * | 6/2010 | Lee et al. ....................... | 359/641 |
| 2011/0209328 A1 * | 9/2011 | Steenblik ................... | B44F 1/06 29/428 |
| 2012/0075870 A1 | 3/2012 | Kayanuma et al. | |
| 2013/0121018 A1 * | 5/2013 | Sasaki et al. .................. | 362/602 |

FOREIGN PATENT DOCUMENTS

| | | |
|---|---|---|
| JP | 2010500735 A | 1/2010 |
| JP | 2012009472 A | 1/2012 |
| WO | 2008017718 A1 | 2/2008 |
| WO | 2008021082 A2 | 2/2008 |
| WO | WO 2011141616 A1 * | 11/2011 ................ F21V 7/04 |

OTHER PUBLICATIONS

PCT Invitation to Pay Additional Fees and, where Applicable, Protest Fee along with Communication Relating to the Results of the Partial International Search dated Oct. 8, 2013 for Application No. PCT/US2013/052964 (5 pages).

PCT International Preliminary Report on Patentability, PCT/US2013/052964, dated Feb. 3, 2015 (10 pages.).

Office Action received in Japanese Application No. 2015-525550, dated Nov. 29, 2016; 6 pages.

* cited by examiner

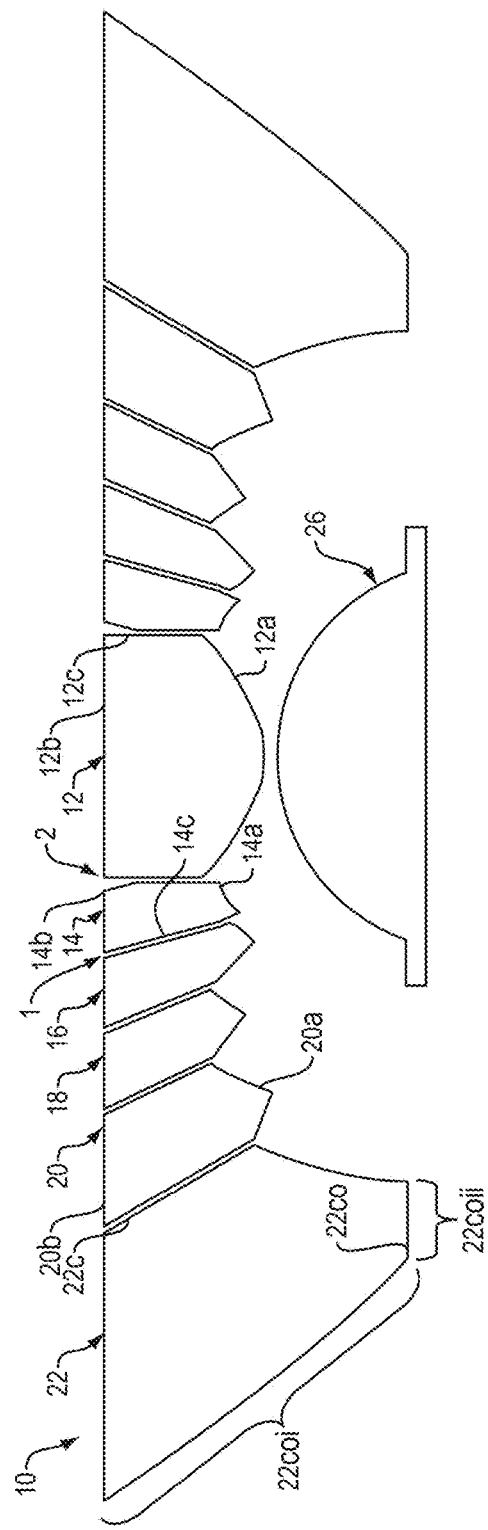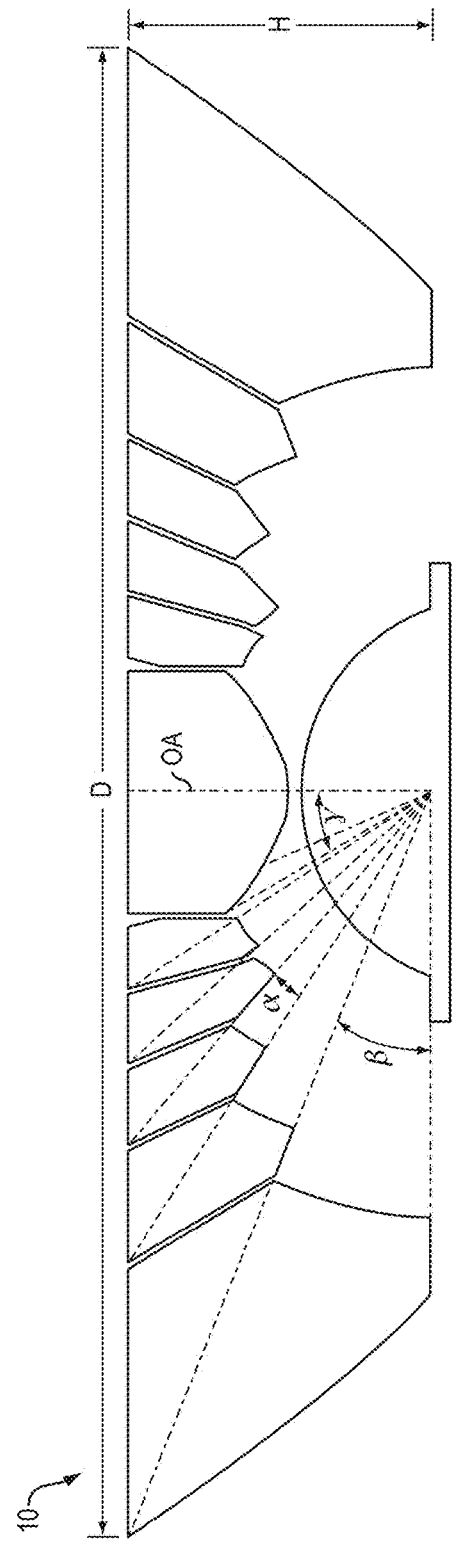

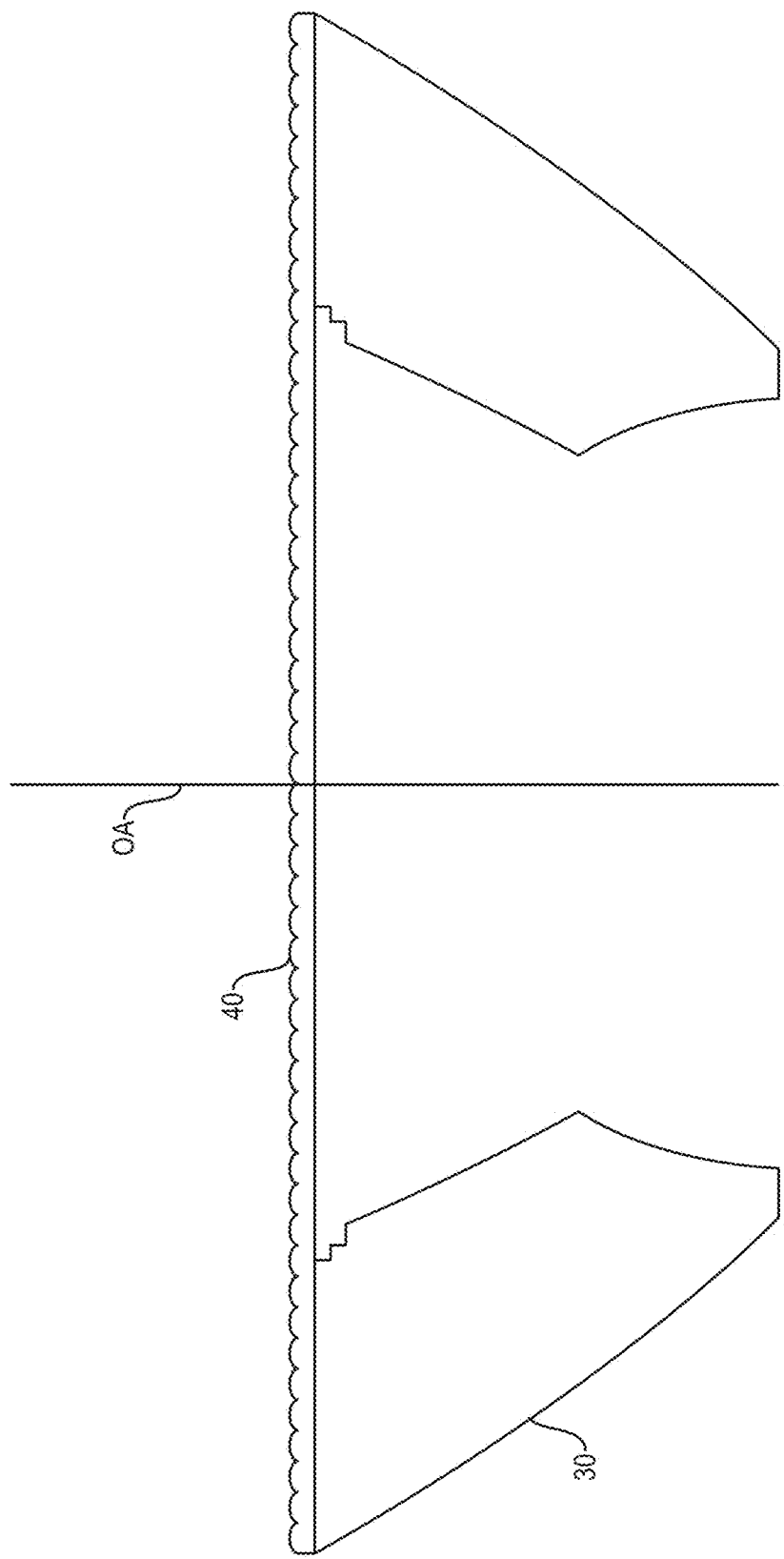

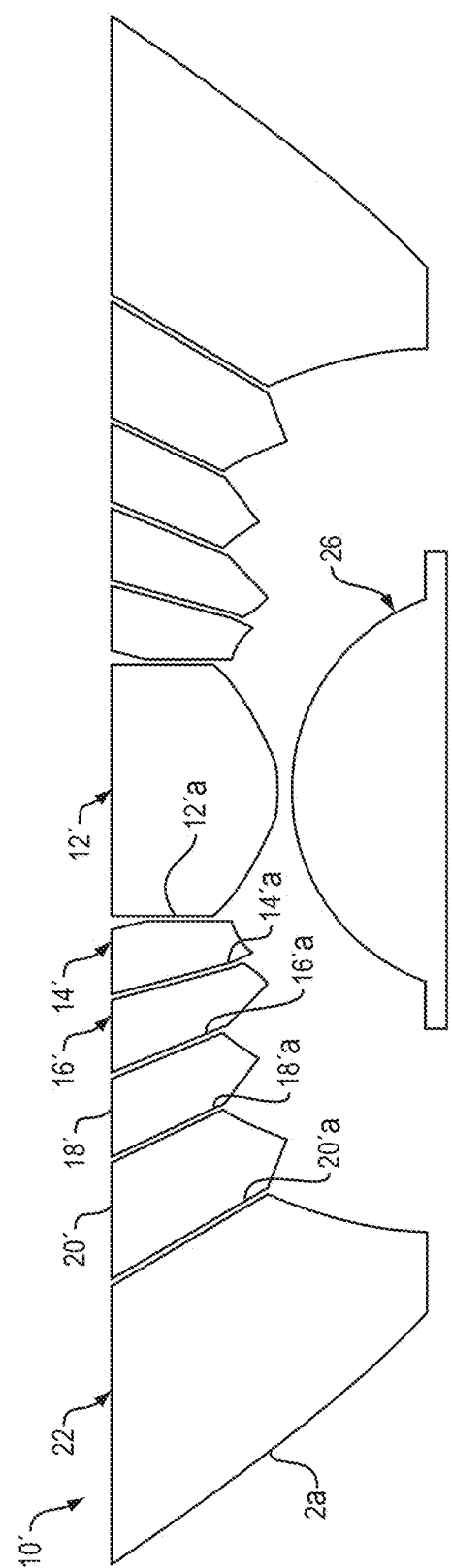

LOW PROFILE MULTI-LENS TIR

RELATED APPLICATIONS

This application claims priority to U.S. Provisional Application No. 61/678,781 filed Aug. 2, 2012 entitled "Low Profile Multi-Lens TIR" and U.S. Provisional Application No. 61/809,631 filed Apr. 8, 2013 entitled "Low Profile Multi-Lens TIR," both of which are hereby incorporated by reference in their entirety.

BACKGROUND

The present invention is generally directed to a lens assembly, and particularly to a lens assembly in which a plurality of lenses collimate light received from a light source via total internal reflection (TIR) as well as optical systems employing such a lens assembly.

In many lighting applications, the light source, e.g., a light emitting diode (LED), can be large. The use of large traditional TIR lenses to collimate light from such large light sources can be problematic. For example, manufacturing such TIR lenses, e.g., via molding, can be difficult. Further, many lighting applications can impose spatial constraints that can render the use of such traditional TIR lenses impractical.

Accordingly, there is a need for improved lenses, optics and lens assemblies for redirecting, e.g., collimating, light emitted by a light source, particularly a large light source.

SUMMARY

In one aspect, an optical lens assembly (herein referred to also as an optic) is provided that comprises a plurality of lenses (or lens segments) adapted to receive light from a light source, each of said lenses (or lens segments) having an input surface and an output surface and a lateral surface extending between the input and output surfaces. The lenses are arranged relative to one another and positioned relative to the light source such that each of the lenses receives at its input surface a different portion of light emitted by the source, e.g., each lens receives at its input surface light emitted by the source into an angular subtense (solid angle) different than an angular subtense associated with another lens. Each lens (or lens segment) guides at least a portion of the received light to its output surface via reflection, e.g., via total internal reflection (TIR).

In some embodiments, the lenses are arranged relative to one another and the light source such that they collectively receive at least about 80 percent, or at least about 90 percent, or 100 percent, of the light energy emitted by the source.

In some embodiments, at least one of the lenses in configured to collimate the light it receives from the light source. In some embodiments, all of the lenses are configured to collimate the light they receive from the light source.

In some embodiments, each of the lenses is rotationally symmetric about an optical axis. In some embodiments, the optical axis of the lenses can coincide with an optical axis of the light source. In some other embodiments, the optical axis of the lenses can be offset relative to an optical axis of the light source.

In some embodiments, the plurality of lenses comprises an inner lens, a middle lens, and an outer lens.

In some embodiments, at least a portion of the lateral surface of at least one of the lenses is separated by an airgap from at least a portion of the lateral surface of an adjacent lens. As discussed in more detail below, such an airgap can allow redirection, via TIR, of the light incident on those portions of the lateral surfaces. In such cases, the lateral surface can be configured in a manner known in the art such that the incident light (or a substantial portion thereof) is incident on the surface at an angle that exceeds the critical angle associated with the interface between the lens body and air so as to cause total internal reflection of the incident light. In some embodiments, at least one of the lenses includes a lateral surface configured to redirect light incident thereon via specular reflection. For example, at least a portion of such a lateral surface can be metalized, e.g., via a metal layer having a thickness in a range of about 10 micrometers to about 100 micrometers, to cause specular reflection of light incident thereon.

In some embodiments, the lateral surface of at least one of the lenses includes two portions forming a non-zero angle, e.g., an acute angle, relative to one another.

In some embodiments, the optical lens assembly can exhibit an aspect ratio, as defined below, that is equal to or less than about 1, e.g., in a range of about 0.1 to about 1.

In some embodiments, at least one of the lenses (or the lens segments) includes input surfaces with the input surface configured to be substantially orthogonal to light rays it receives from the light source. In some embodiments, a central lens (or lens segment) can include a curved surface for collimating the received light via refraction. In some embodiments, at least one, or all, of the outer lenses surrounding the central lens an include a concave input surface configured as a section of a putative sphere centered on the light source.

In related aspects, the plurality of lenses are removably and replaceably coupled to one another. For example, in some embodiments, each of the lenses is selectively removable and replaceable independent of the other lenses.

In some aspects, the optical lens assembly can further comprise a lens cap configured to receive light from one or more of the output surfaces of the plurality of lenses and from the light source. In some embodiments, the cap includes a textured surface, e.g., a plurality of microlenses.

In some embodiments of the above optical lens assembly, the lenses are fixedly coupled to one another with each lens at least partially disposed in a cavity of an adjacent outer lens. In some such embodiments, at least one of the lenses includes an annular shoulder seated in an annular recess of an outer adjacent lens such that a lateral surface of that lens is separated by a gap from a respective lateral surface of the outer adjacent lens. In some embodiments, the optical lens assembly can further include a retaining ring for fixating the lenses in a defined relationship relative to one another.

In further aspects, an optical system is disclosed, which comprises a light source, and an optical lens assembly that is coupled to the light source to receive light therefrom. The optical lens assembly includes a central lens, and a plurality of outer lenses disposed about the central lens, where the lenses of the optical lens assembly are arranged relative to one another and relative to the light source such that each lens receives light emitted by the source into a different angular subtense.

In some embodiments, the outer lenses are annulus-shaped lenses that circumferentially surround the central lens at progressively increasing radial distances from the central lens. In some embodiments, a lateral surface of each of the lenses is separated by a gap from a lateral surface of an adjacent lens.

In some embodiments, the lenses can be removably and replaceably coupled to one another. In some embodiments, each lens can be selectively removed and replaced independent of the other lenses.

In some embodiments of the above optical system, the optical lens assembly can have an aspect ratio in a range of about 0.1 to about 1.

In some embodiments, in the above optical system, the optical lens assembly is configured to redirect at least a portion of the light received from the light source via total internal reflection. For example, in some such embodiments, each of the lenses includes an input surface, an output surface and a lateral surface that extends between the input and the output surfaces, where the lateral surface of at least one of the lenses is configured to reflect the light from the source incident thereon via total internal reflection.

In some embodiments of the above optical system, the input surface of the central lens is a convex surface adapted to collimate light (i.e., it generates a set of substantially parallel light rays) it receives from the light source and each of the outer lenses includes a concave input surface configured as a section of a putative sphere centered on the light source.

In other aspects, a kit is disclosed that includes a plurality of lenses configured to removably and replaceably couple to one another to form a lens assembly configured to receive light from a light source. The lenses of the lens assembly are arranged relative to one another such that such that each of the lenses can receive at input surface light emitted by the source into an angular subtense different from a respective angular subtense associated with another lens. In some embodiments, at least one of the lenses guides at least a portion of the received light to its output surface via total internal reflection at a lateral surface that extends between the input surface and the output surface.

Various features of each embodiment described above can be combined with one or more features of the other embodiments. Further understanding of various aspects of the invention can be obtained by reference to the following detailed description in conjunction with associated drawings, which are described briefly below.

BRIEF DESCRIPTION OF THE DRAWINGS

FIG. 1A schematically depicts a cross-sectional view of a lens assembly according to an embodiment of the invention, FIG. 1B schematically depicts exemplary ray traces through some lenses of the lens assembly of FIG. 1A, FIG. 8 is a schematic cross-sectional view of another lens assembly according to another embodiment of the invention, FIG. 15 is a schematic cross-sectional view of a lens assembly according to another embodiment of the invention.

DETAILED DESCRIPTION

Figure 2A:
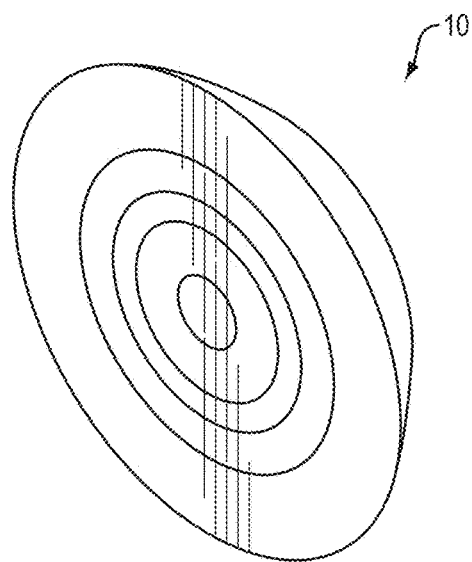
FIG. 2A is an elevation view of the lens assembly of FIG. 1A depicting its output surface.
Figure 2B:
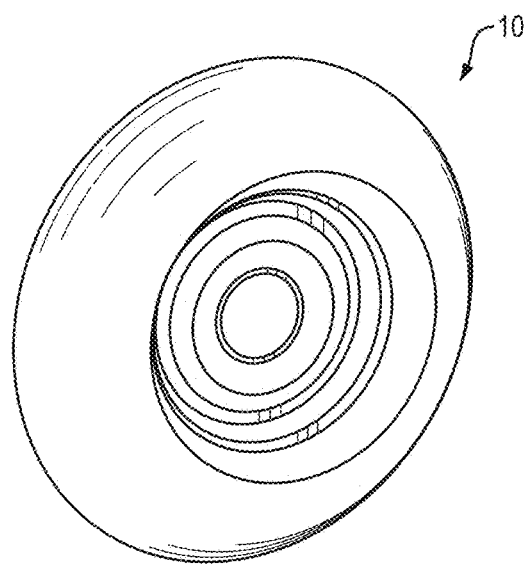
FIG. 2B is an elevation view of the lens assembly of FIG. 1A depicting its input surface.
Figure 3A:
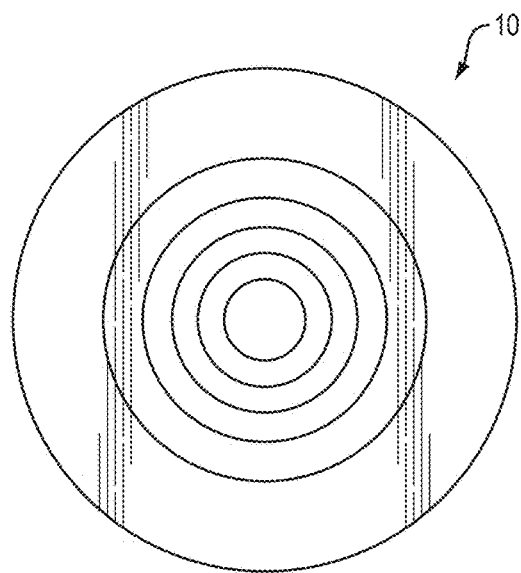
FIG. 3A is a view of the output surface of the lens assembly of FIG. 1A.
Figure 3B:
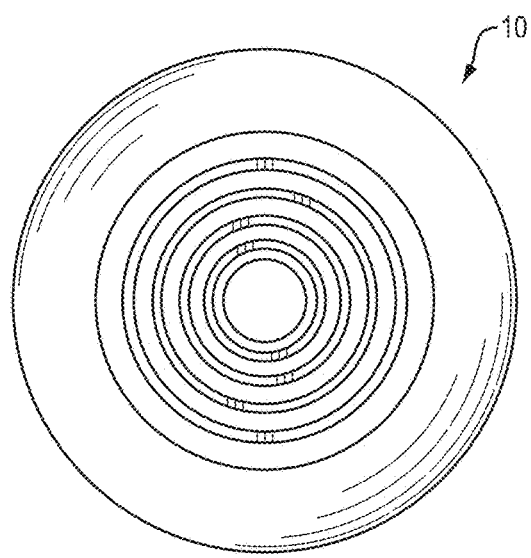
FIG. 3B is a view of the input surface of the lens assembly of FIG. 1A, FIGS. 4 and 5 schematically depict one way of assembling the lenses of a lens assembly according to an embodiment of the invention.

The present invention is generally directed to a lens assembly (herein also referred to as an optic) that includes a plurality of lenses arranged to receive light from a light source such that each lens receives at its input surface light emitted by the source into a different angular subtense associated with that lens. Each lens is configured to redirect at least a portion of the received light to an output surface via total internal reflection (TIR), or in some cases via specular reflection. In many embodiments, an airgap can separate lateral surfaces of adjacent lenses to allow those surfaces to function as TIR surfaces for redirecting, e.g., collimating, the light incident thereon. This in turn allows achieving a high level of redirection (collimation) while keeping the height of the lens assembly at a desired level. The lens assemblies according to various embodiments can be used in a variety of lighting applications, and particularly in those in which mechanical geometry requires minimal optic height and a high level of collimation. For example, they can be particularly useful in applications in which large light emitting diodes (LEDs) are employed.

The phrase an "angular subtense" is used consistent with its meaning in the art. For example, an angular subtense associated with a lens refers to a region of space defined by a solid angle that has its apex at the light source and that subtends an input surface of the lens (See, e.g., FIG. 1B).

The terms "about" is used herein to mean a deviation of at most 5 percent, e.g., between 1 and 5 percent, in a value. The phrase "substantially orthogonal" as used herein refers to an angle of 90 degrees within a deviation of at most 5-degrees, e.g., 1, 2 or 5-degrees.

The phrase "substantially parallel to the optical axis" as used herein refers to a direction that is parallel to the optical axis with a deviation, if any, of at most 5-degrees from parallelism.

FIGS. 1A, 1B, 2A, 2B, 3A and 3B schematically depict a lens assembly 10 according to an embodiment of the invention that includes a plurality of lenses 12, 14, 16, 18, 20, and 22 (herein collectively referred to as lenses 24) that are adapted to receive light emitted from a light source 26. In this embodiment, the lenses 24 are rotationally symmetric about the optical axis OA, which coincides with the optical axis of the light source 26. In this embodiment, the lens 12 is a central lens that is circumferentially surrounded by annulus-shaped lenses 14, 16, 18, 20, and 22 (herein referred to collectively as the outer lenses), which are disposed progressively at greater radial distances from the optical axis (OA) (the radial distance refers to a distance perpendicular to the optical axis). In other embodiments, the optical axis of the lenses, e.g., an axis about which the lenses exhibit a rotational symmetry, may be offset relative to a respective optical axis of the light source. Further, in some embodiments, one or more of the lenses may not be rotationally asymmetric.

In this embodiment, the lenses are arranged relative to one another such that each lens receives light emitted by the source into a different angular subtense (solid angle). By way of example, with reference to FIG. 1B, in this embodiment, the central lens 12 receives light emitted by the light source into an angular subtense γ while the lenses 18 and 22 receive light emitted by the source into different angular subtenses α and β, respectively. In this manner, the lenses collectively receive light emitted by the source into different solid angles. In some embodiments, the lenses collectively receive at least about 80 percent, or at least about 85 percent, or at least about 90 percent, or at least about 95 percent, or 100 percent, of the light energy emitted by the source.

As discussed in more detail below, each of the lenses 24 includes an input surface for receiving light from the light source and an output surface through which light exits the lens and a lateral surface that extends between the input surface and the output surface. At least a portion of the light that is coupled into the lens body via the input surface is incident on the lateral surface so as to be totally internally reflected at that surface toward the output surface for exiting the lens. In this manner, the lens assembly 10 redirects, e.g., collimates, via total internal reflection at least a portion of the light it receives.

By way of example, the lens 14 includes an input surface 14a, an output surface 14b, and a lateral surface 14c that extends between the input surface 14a and the output surface 14b. In this embodiment, the input surface 14a is a concave surface that is shaped as a section of a putative sphere centered at the light source such that the light from the source (i.e., the light emitted by the source into the angular subtense associated with the lens 14) is incident thereon in a substantially orthogonal direction (as discussed below, in this embodiment, the input surfaces of the other lenses 16, 18, 20, and 22 are also shaped as sections of the putative spherical surface centered on the light source). In this manner, the light enters the lens without much deviation from its propagating direction to be incident on the lateral surface 14c. The lateral surface 14c is separated from a respective lateral surface of adjacent lenses 12 and 16 by airgaps 1 and 2. As air has an index of refraction that is lower than that of the material forming the lenses, the lateral surface 14c can be configured in a manner known in the art to cause total internal reflection of the light incident thereon, or at least a portion of that light (e.g., at least about 80% or 90%, or 100%). In this embodiment, the lateral surface is configured to collimate the light incident thereon via TIR along a direction that is substantially parallel to the optical axis (OA) (i.e., parallel to the optical axis (OA) within a deviation of at most 5-degrees, e.g., 1, 2, or 5 degrees). The collimated light then exits the lens through the output surface 14b, which is substantially flat and orthogonal to the optical axis OA. In other embodiments, one or both of the input and output surfaces 14a and 14b can have other shapes.

In this embodiment, the lenses 16, 18, 20 and 22 also include concave input surfaces (e.g., input surface 20a of the lens 20) that are configured as sections of a putative sphere centered on the light source so as to be substantially orthogonal to the light incident thereon, and further include flat output surfaces (e.g., the output surface 20b of the lens 20) that are substantially orthogonal to the optical axis (OA). In these lenses, the outer segment of the lateral surface (e.g., the portion 22co of the lateral surface 22c of the lens 22) can be formed of two portions that form an angle relative to one another (e.g., portions 22coi and 22coii, where the segment 22coii does not participate in light redirection) so as to ensure that the input surface is substantially orthogonal to the light it receives from the light source. Similar to the lens 14, the lateral surfaces of these lenses are also separated by airgaps from lateral surfaces of adjacent lenses and are configured to redirect incident light via TIR.

In contrast to the outer lenses, the inner central lens 12 includes a generally convex curved input surface 12a that substantially collimates the light it receives from the light source via refraction to redirect that light to its flat output surface 12b, which is orthogonal to the optical axis (OA), for exiting the lens. While the outer lenses redirect the received light substantially via TIR for exiting their output surfaces in a direction substantially parallel to the optical axis, the inner lens redirects the received light substantially via refraction (e.g., refraction at its input surface) for exiting its output surface in a direction parallel to the optical axis. In this manner, the lens assembly collectively collimates the light received from the source. It should be understood that some light rays may strike the lateral surface of the inner lens 12 to be reflected via TIR (an airgap separates the lateral surface of lens 12 relative to that of lens 14).

In other embodiments, the central lens 12 can be configured to redirect the received light, e.g., to collimate the received light, primarily via TIR, e.g., in a manner discussed above in connection with the outer lenses.

With reference to FIG. 1B, the lens assembly 10 can have an aspect ratio equal to or less than about 1, e.g., in a range of about 0.1 to about 1, where the aspect ratio is defined herein as the ratio of the height (H) of the assembly (in this case, the linear extent of the lens assembly along the optical axis OA) relative to the largest linear dimension of a putative surface that comprises all the output surfaces of the lenses and airgaps, if any, separating them; in this case, the diameter (D). In many embodiments, this aspect ratio allows an efficient redirection, e.g., collimation, of the light emitted by the source, particularly a large source such as a large LED, while ensuring that the height of the lens assembly remains below a desired value. In particular, a putative parabola (a geometry most associated with light collection) centered on the light source and having a similar diameter D of the optic's aperture would have an aspect ratio, as defined above, that can be represented by the following mathematical relation:

$$\text{Aspect ratio} = \frac{Bx^2 + C}{x}$$

where x denotes the radius of the aperture (x=D/2), and B and C are constant.

The above relation shows that as x increases, the aspect ratio of such a putative parabola increases rapidly such that it would be greater than 1 in many practical applications. In contrast, the lens assembly according to the invention can provide redirection (e.g., collimation) performance that is at least equal to, and in many cases better than, the respective performance of such a parabolic reflector while exhibiting a smaller aspect ratio, e.g., an aspect ratio less than 1.

The lenses 24 can be made from a variety of different materials. Some examples of such materials include, without limitation, poly methyl methacrylate (PMMA), poly methyl methacrylimide (PMMI), cyclic olefin copolymer (COC), among others. In some embodiments, each of the lenses 24 can be molded individually (e.g., via injection molding) and then assembled. Many manufacturing methods are available for assembling the lenses. Some examples of such methods include, without limitation, ultra-sonic welding, gluing, heat-stacking, snap fitting, force fitting, etc.

Figure 4:
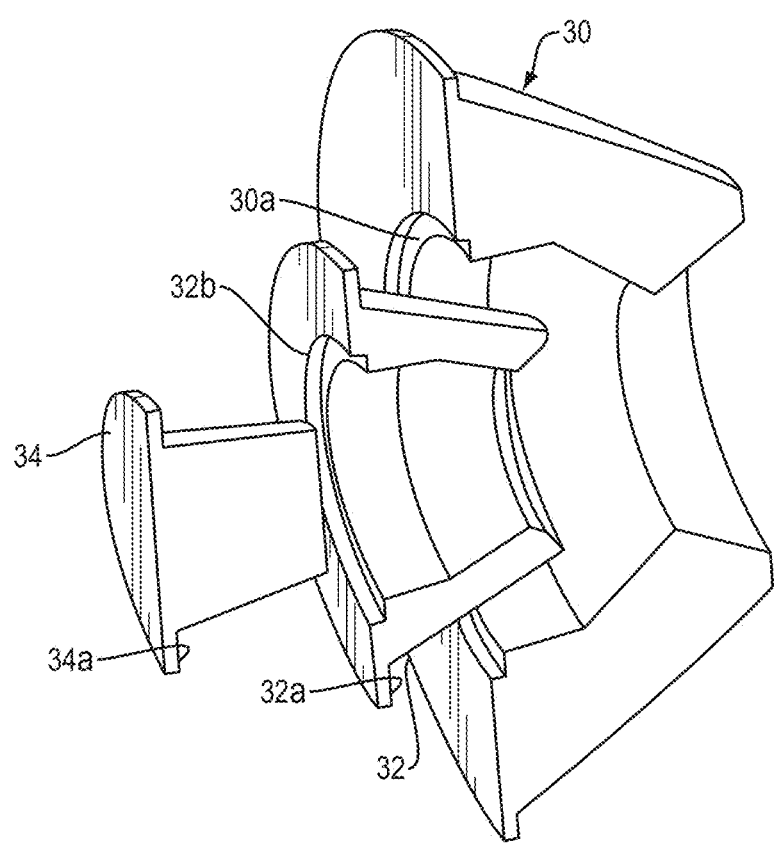
Figure 5:
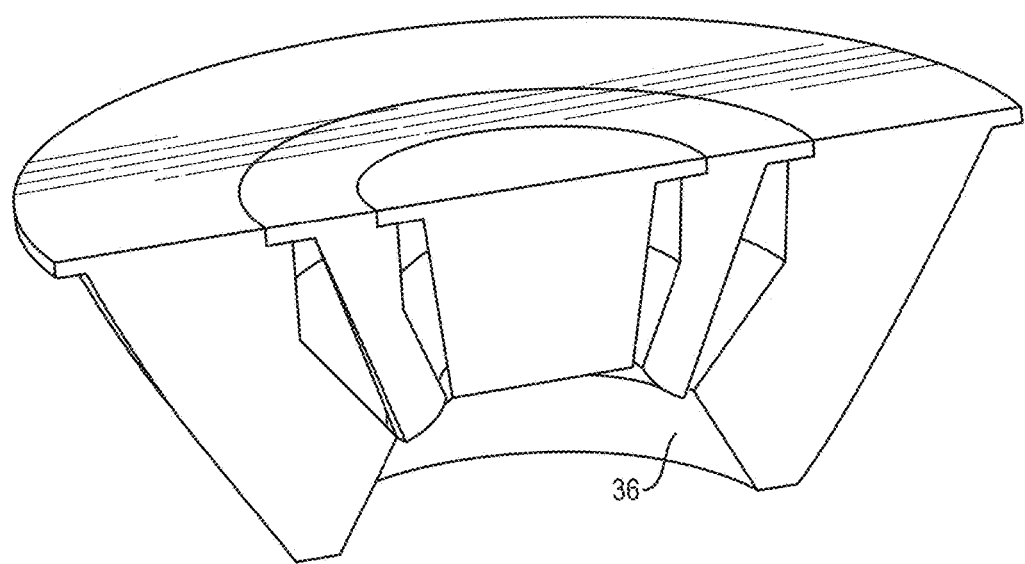

As noted above, the lenses 24 of the lens assembly 10 can be fixated relative to one another in a variety of different ways. By way of example, FIGS. 4 and 5 schematically depict one way of stacking three of such lenses and fixating them relative to one another such that airgaps separate lateral surfaces of adjacent lenses. In particular, in this example, an outermost lens 30 includes a central cavity into which a lens 32 can be inserted. The lens 32 includes a shoulder 32a surrounding its output surface that can be seated in a recess 30a of the lens 30 such that an airgap separates the lateral surfaces of the lenses 30 and 32. A central lens 34 can then be received by a central cavity of the lens 32. Again, a shoulder 34a of the lens 34 can be seated in a recess 32b of the lens 32 such that the lateral surfaces of the two lenses are separated by an airgap. A retaining ring 36 can then hold the lenses in place.

In some embodiments, the output surfaces of one or more of the lenses can include a textured surface, e.g., a plurality of microlenses, to alter the light incident on the output surface(s), e.g., the collimated light, to achieve specific beam angles.

In some embodiments, the lenses 24 of the lens assembly 10 can be selectively removable and/or replaceable so as to allow the configuration of the lens assembly 10 to be altered so as to control the far-field illumination pattern, for example. For example, each of the lenses can be removed and replaced independent of the other lenses, i.e., without a need to remove any of the other lenses.

Additionally or alternatively, a lens cap can be configured to couple to the output end of the lens assembly 10 for altering (e.g., diffusing) the light exiting the lens assembly 10 and/or preventing a person from receiving light directly from the light source. In such a manner, the user can selectively couple the lenses and/or lens cap in various combinations such that the lens assembly 10 produces a specified beam angle or far-field illumination pattern.

Figure 6:
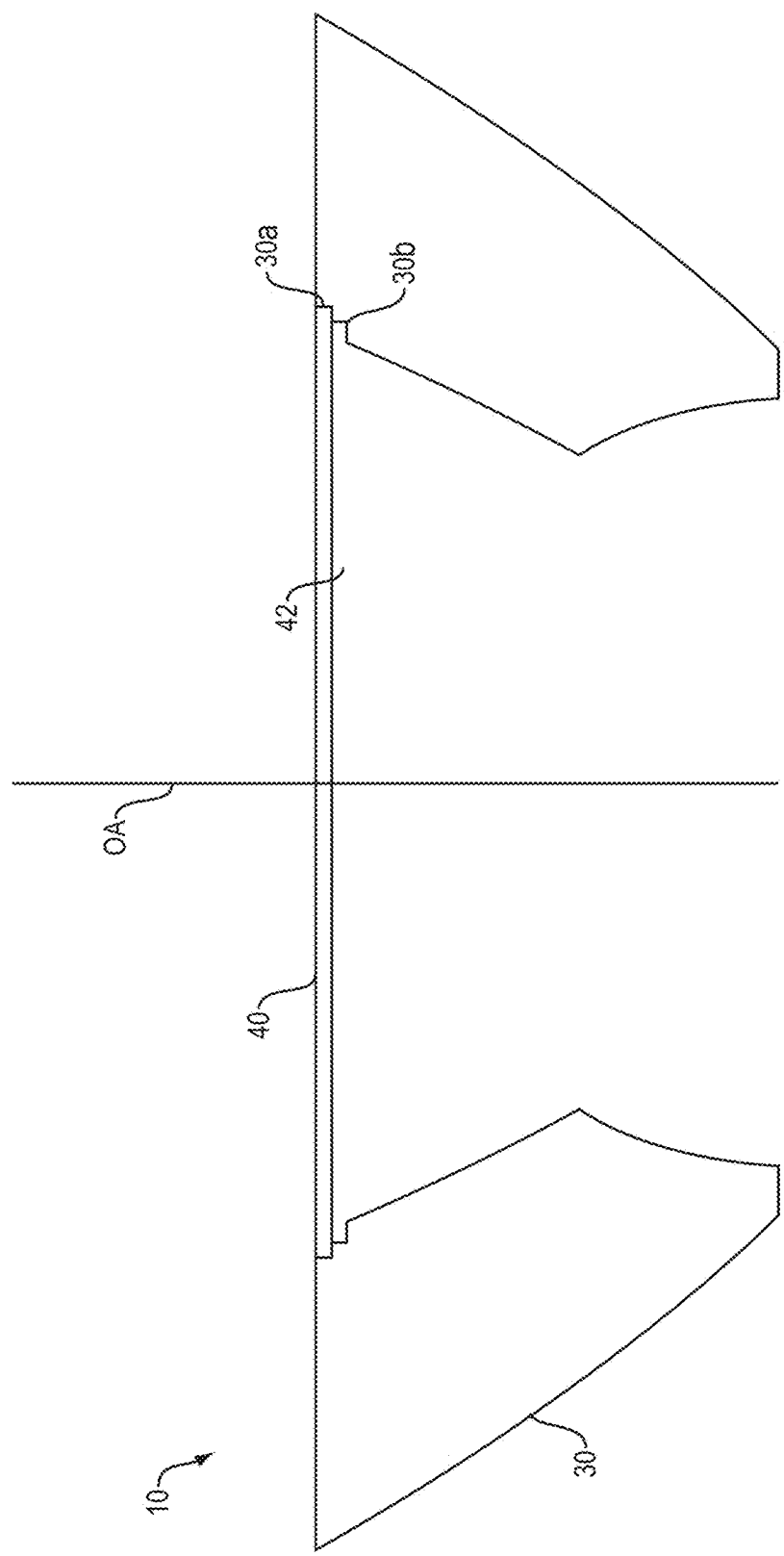
FIG. 6 is a schematic cross-sectional view of a lens assembly according to another embodiment of the invention.
Figure 7B:
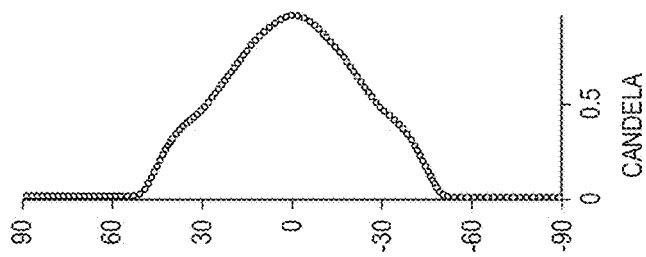
FIG. 7B shows the light intensity along the y-axis of the distribution pattern shown in FIG. 7A.
Figure 7A:
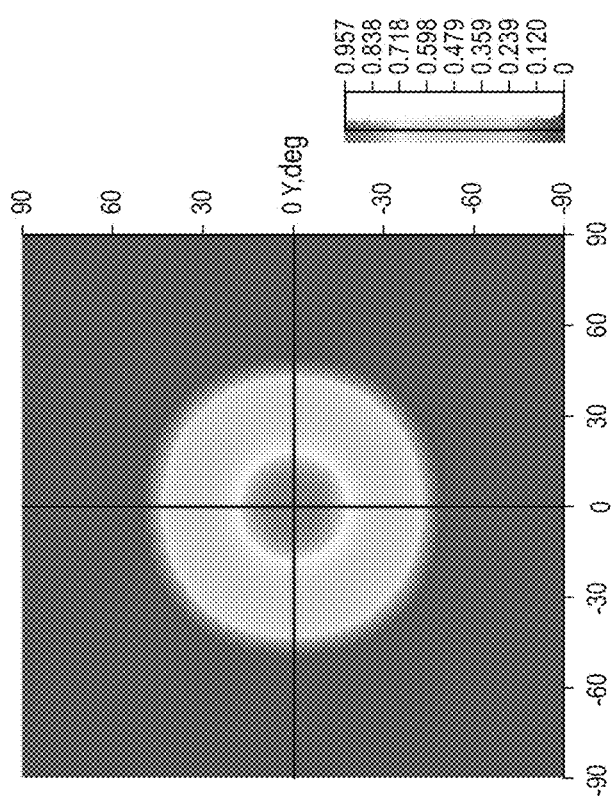
FIG. 7A is an exemplary distribution pattern of light exiting a lens assembly based on an implementation of the embodiment of FIG. 6.
Figure 7C:
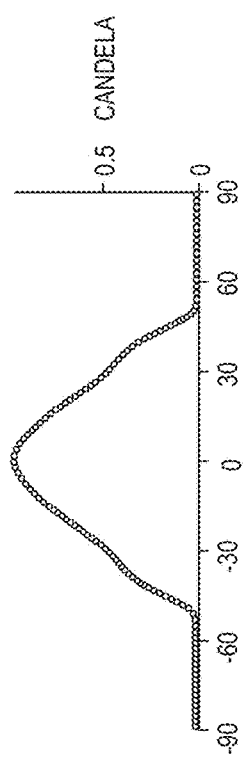
FIG. 7C shows the light intensity along the x-axis of the distribution pattern shown in FIG. 7A.

For example, with reference now to FIGS. 6-13, an exemplary lighting assembly 10 is depicted in which various lenses can be selectively coupled to one another and/or to which a lens cap 40 can be selectively applied so as to control the distribution of light exiting the lens assembly 10. With specific reference first to FIG. 6, the exemplary lighting system 10 includes an annular outer lens 30 defining a central cavity 42 and having two annular recesses 30a,b surrounding the central cavity adjacent the output end of the outer lens 30, for example, as described above with reference to FIGS. 4 and 5. As shown in FIG. 6, however, a lens cap 40 can be configured to be disposed within the recess 30a and across the central cavity such that light emitted by the source through the central cavity 42 is diffused by the lens cap 40. As such, a user can configure the lens assembly 10 as shown in FIG. 6 to produce a very wide beam far-field distribution pattern (e.g., a flood pattern), e.g., such as that depicted in FIGS. 7A, 7B, and 7C.

The lens cap 40 can have a variety of configurations so as to control the distribution of light. By way of example, the lens cap 40 can have a textured surface, e.g., a plurality of microlenses, to alter the light incident on the lens cap 40 to achieve specific beam angles.

Rather than rest within the recess 30a, it will be appreciated that the lens cap 40 can alternatively be coupled to the lens assembly such that light exiting the output surface of the outer lens 30 also passes through the lens cap 40, as depicted in FIG. 8, for example.

Figure 9:
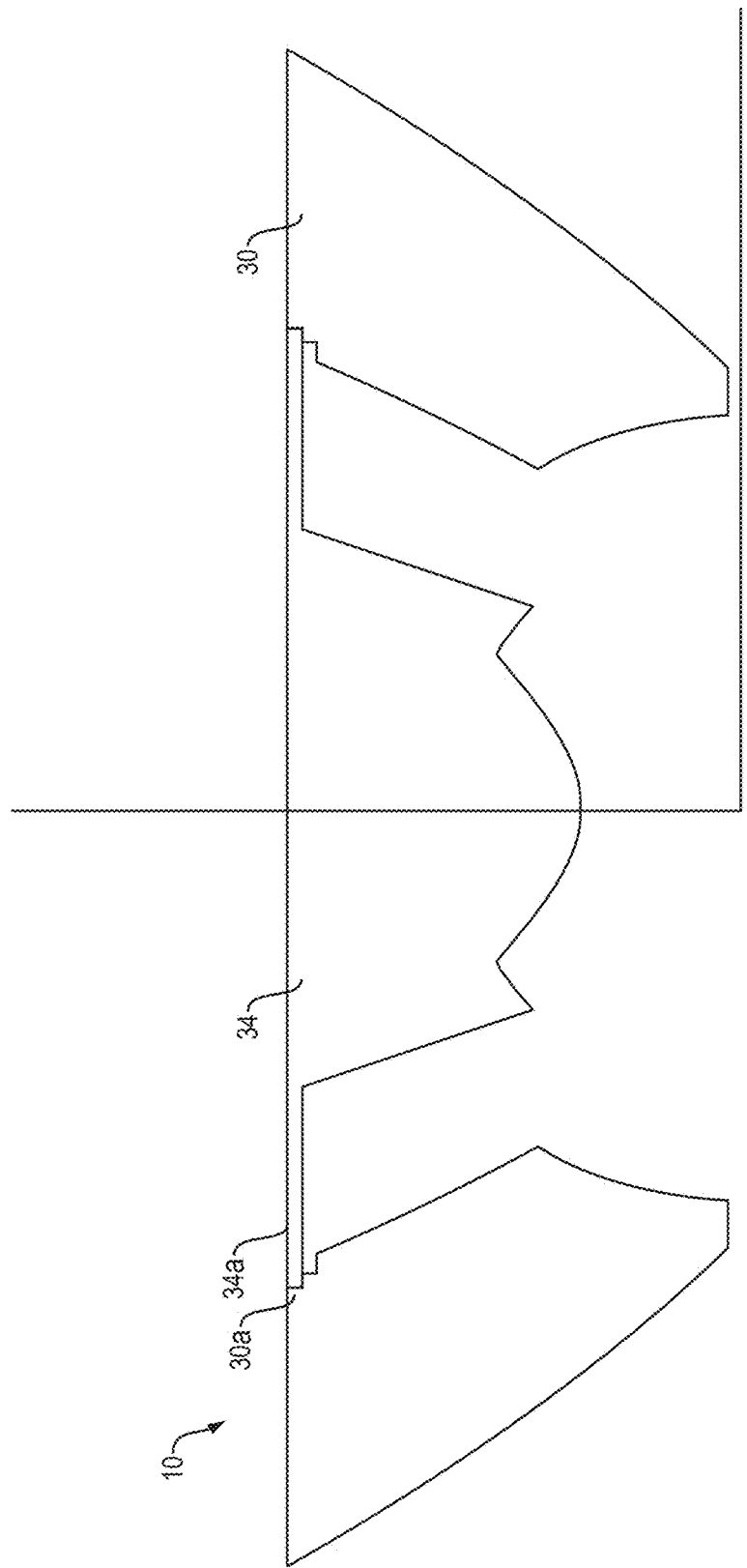
FIG. 9 is a schematic cross-sectional view of another lens assembly according to another embodiment of the invention.
Figure 10B:
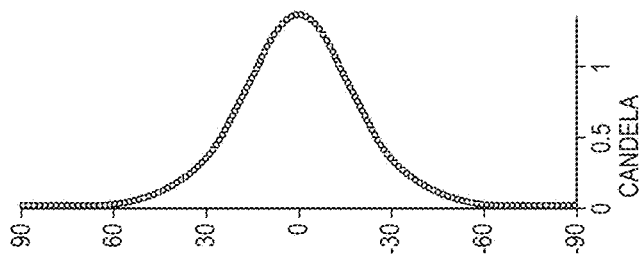
FIG. 10B shows the light intensity along the y-axis of the distribution pattern shown in FIG. 10A.
Figure 10A:
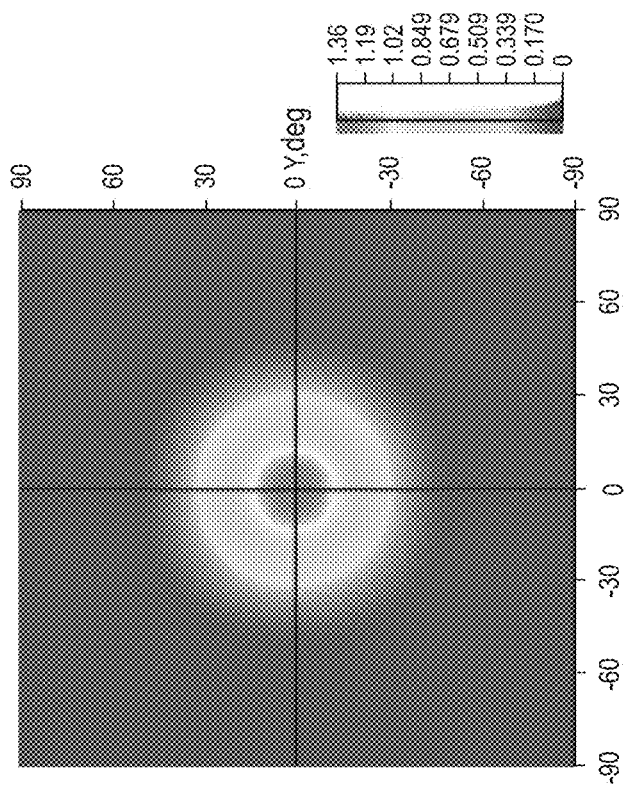
FIG. 10A is an exemplary distribution pattern of light exiting a lens assembly based on an implementation of the embodiment of FIG. 9.
Figure 10C:
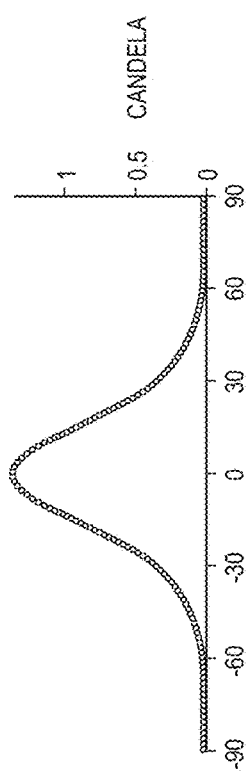
FIG. 10C shows the light intensity along the x-axis of the distribution pattern shown in FIG. 10A.

With reference now to FIG. 9, in another exemplary configuration of the lens assembly 10, the lens cap 40 of FIG. 6 can be removed and replaced with an inner lens 34 having a shoulder 34a configured to engage the recess 30a of the outer lens 30 (alternatively, the lens cap 40 of FIG. 8, can be disposed on or coupled to the output surface of both the outer lens 30 and inner lens 34). As discussed otherwise herein, the input surface, the output, and the lateral surfaces of the inner lens 34 can be configured so as to control the beam angle of the light exiting the output surface of the inner lens 34. In such a manner, the user can generate a wide beam output via the light exiting the outer lens 30 and inner lens 34, for example, as depicted in FIGS. 10A, 10B, and 10C. It will further be appreciated that in some embodiments, the shoulder 34a of the inner lens 34 can diffuse the light impinging thereon from the source or have a textured surface (e.g., a microlens array) so as to control the distribution of light exiting therefrom.

Figure 11:
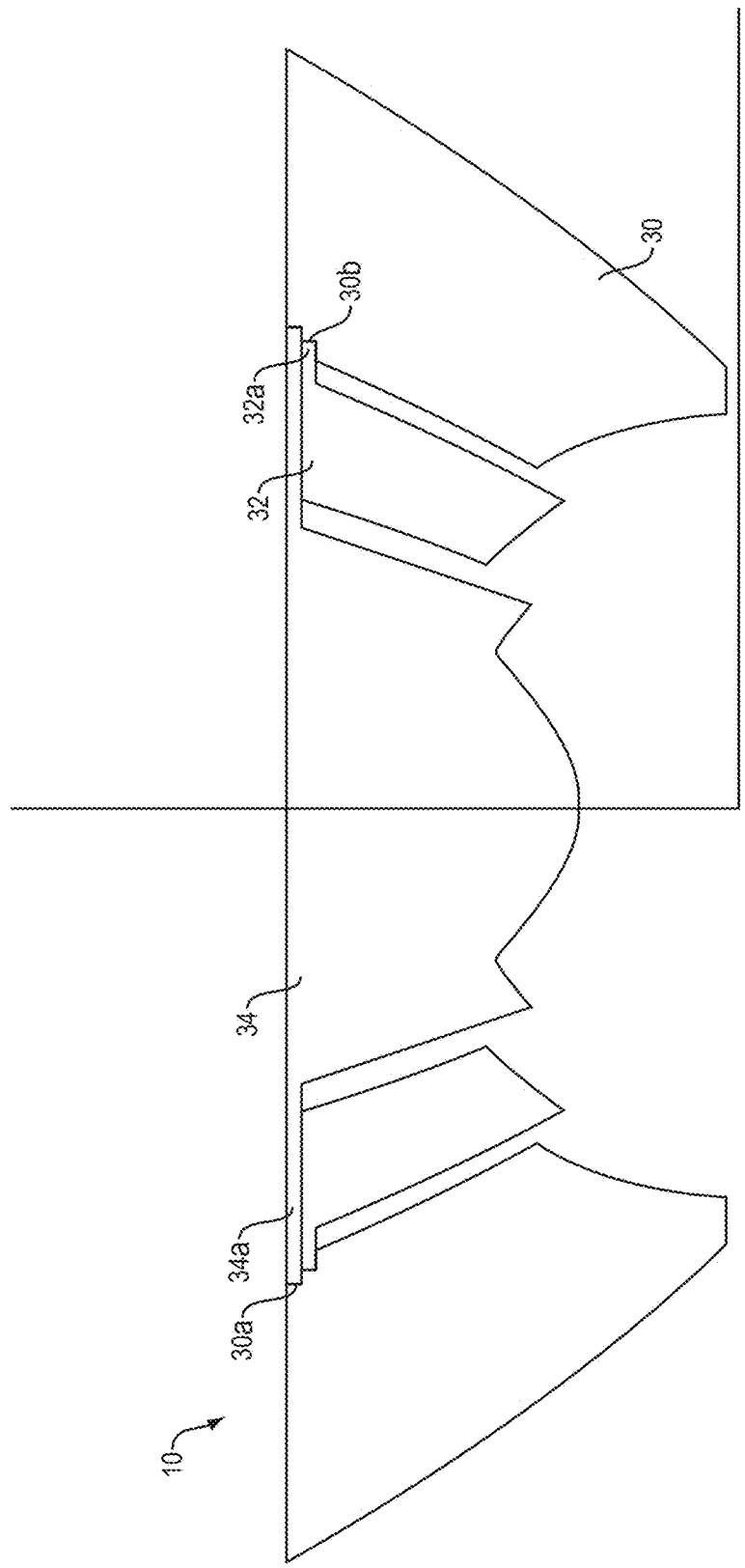
FIG. 11 is a schematic cross-sectional view of another lens assembly according to another embodiment of the invention.
Figure 12B:
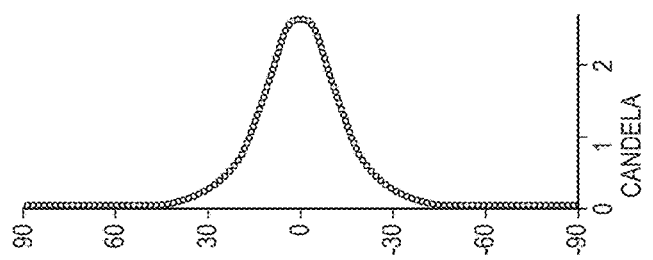
FIG. 12B shows the light intensity along the y-axis of the distribution pattern shown in FIG. 12A.
Figure 12A:
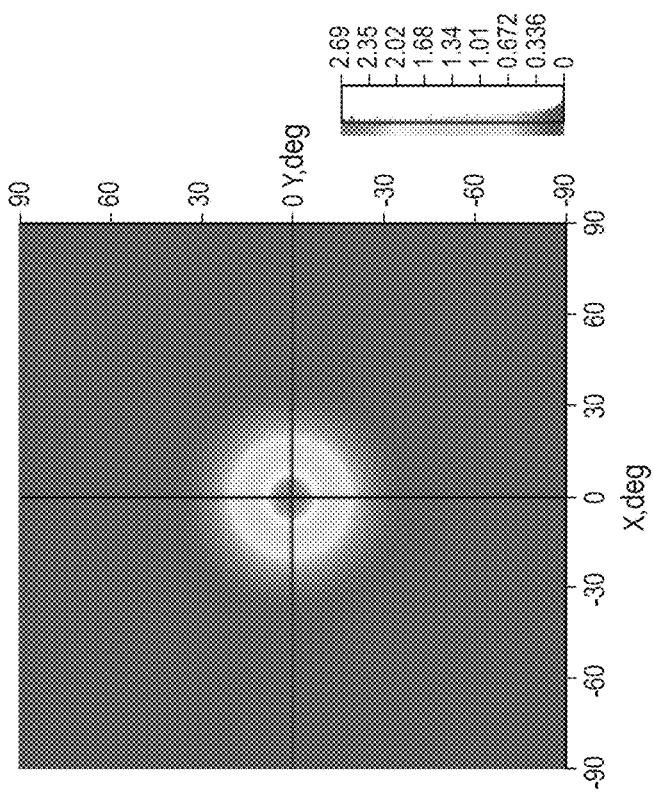
FIG. 12A is an exemplary distribution pattern of light exiting a lens assembly based on an implementation of the embodiment FIG. 11.
Figure 12C:
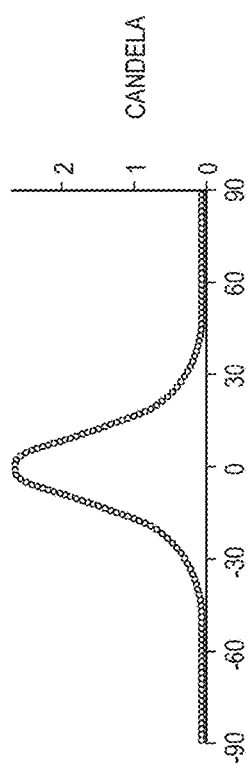
FIG. 12C shows the light intensity along the x-axis of the distribution pattern of FIG. 12A.

With reference now to FIG. 11, another exemplary configuration of the lens assembly 10 is depicted which can be used to provide a medium beam lens that can produce, e.g., the exemplary light distribution depicted in FIGS. 12A, 12B, and 12C. The configuration of the lens assembly 10 in FIG. 11 is like that depicted in FIG. 9 but differs in that a middle lens 32 is disposed within the central cavity and between the outer lens 30 and the inner lens 34. As will be appreciated by a person skilled in the art, the middle lens 32 can also include a shoulder 32a and can be dimensioned so as to engage the recess 30b of the outer lens 30, with the shoulder 34a of the lens 34 extending over the middle lens 32 and remaining in engagement with the recess 30a of the outer lens.

Figure 13:
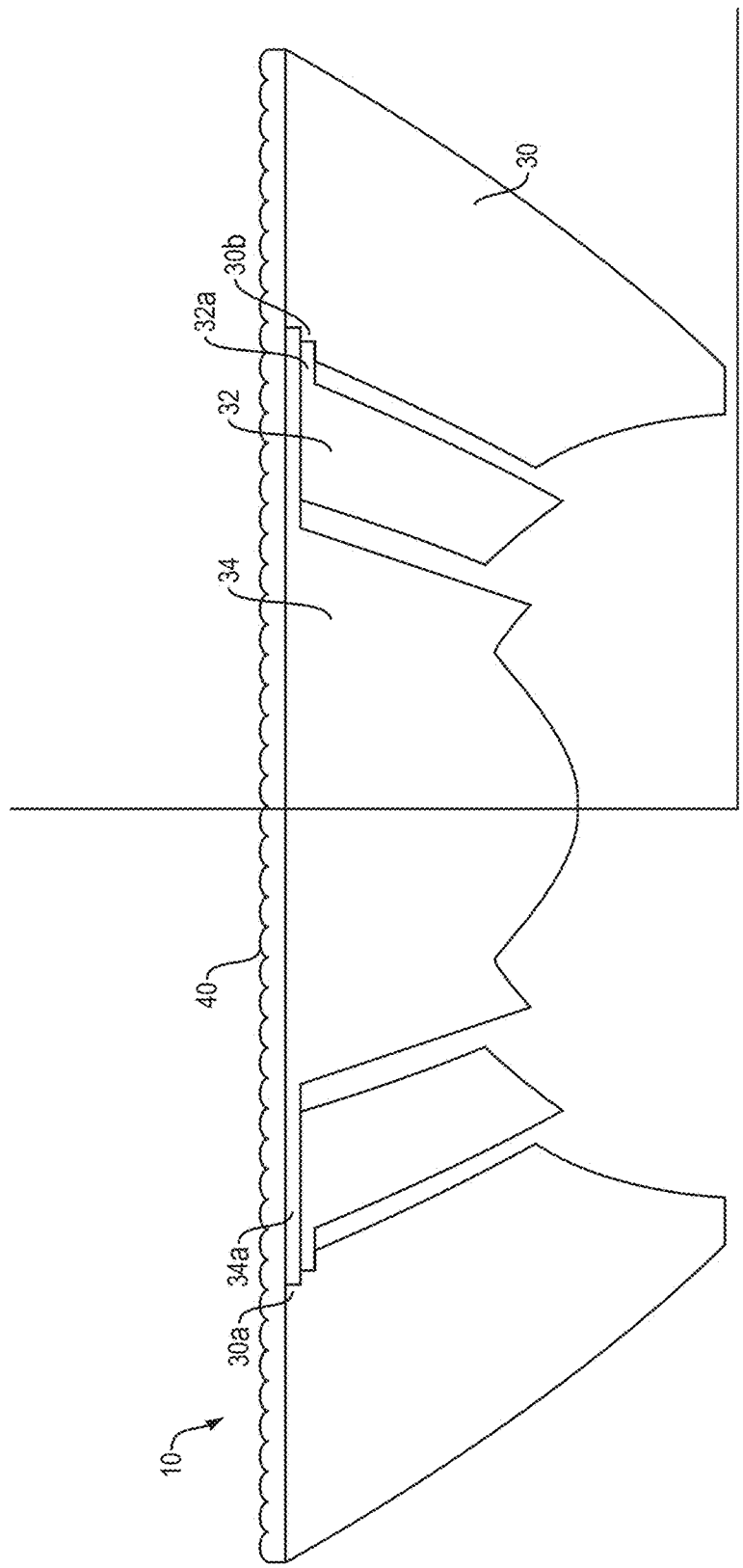
FIG. 13 is a schematic cross-sectional view of another lens assembly according to another embodiment of the invention.
Figure 14B:
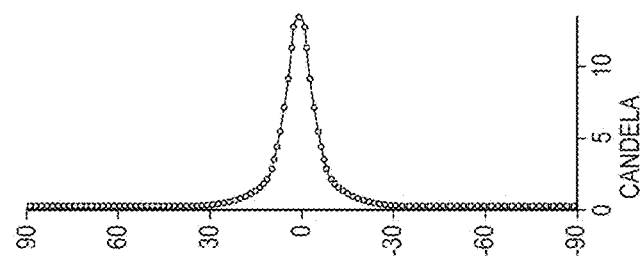
FIG. 14 is an exemplary distribution pattern of light exiting an implementation of the lens assembly of FIG. 11 without the lens cap.
Figure 14A:
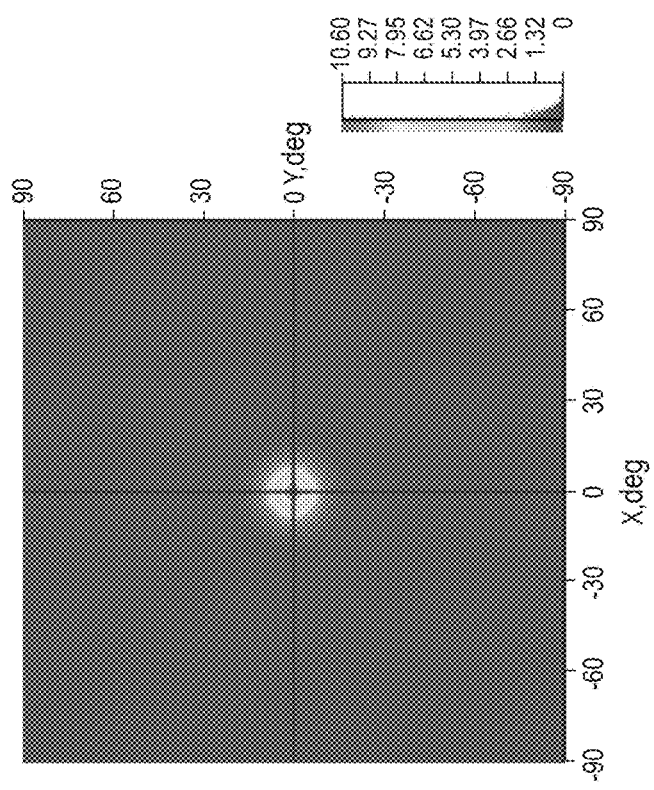
Figure 14C:
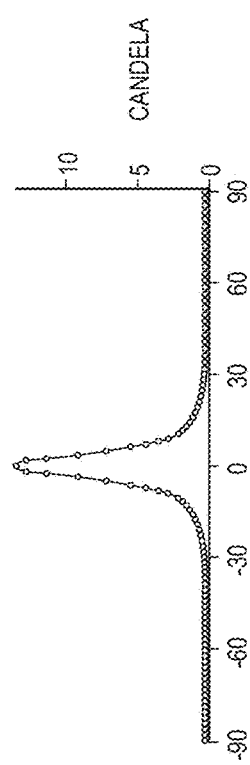

Similar to the discussion above in which the inner lens 34 and middle lens 32 can be selectively replaced, the outer lens 30 can also be removable and replaceable in the lens assembly 10 so as to control the output pattern of light. By way of example, the outer lens 30 can be replaced by one of a similar size but having different output characteristics so as to generate a more narrow beam (e.g., without a microlens array on its output surface). Alternatively, the lens cap 40 described above with reference to FIG. 8, which can be disposed over the outer lens 30, middle lens 32, and inner lens 34 (i.e., medium beam pattern) as shown in FIG. 13, can be removed as shown in FIG. 11 such that the output beam becomes narrow, for example, as depicted in FIGS. 14A, 14B, and 14C.

It will thus be appreciated in light of the present teachings that there exits many variations and configurations for the output surfaces of the various lenses and their nesting configurations with or without a lens cap 40 that can be used to tailor the output of the lens assembly 10 to a particular application.

Further, in some embodiments, one or more of the lenses can employ specular reflection, rather than total internal reflection, for redirecting, for example, collimating, at least a portion of the light received from the light source. For example, in some such embodiments, at least a portion (and in some cases the entire) lateral surface of one or more of the lenses can be metalized to provide specular reflection of the light incident thereon. In some embodiments, a combination of specular and total internal reflection can be employed for redirecting the light received from the light source.

By way of example, FIG. 15 schematically depicts a lens assembly 10' according to another embodiment of the invention that includes a plurality of lenses 12', 14', 16', 18', 20' and 22' arranged in a fixed relationship relative to one another to receive light from the light source 26. Similar to the lens assembly 10 discussed above, each of the lenses of the lens assembly 10' is configured and positioned relative to the light source so as to receive light emitted by the source into a different solid angle (angular subtense). While the lenses in the lens assembly 10 rely on total internal reflection to redirect at least some of the received light, the lenses in the lens assembly 10' rely on specular reflection for redirecting at least a portion of the received light. In particular, at least a portion of the lateral surface of each of the lenses of the lens assembly 10' is metalized (e.g., a thin metal layer having a thickness in a range of about 10 micrometers ($\mu$m) to about 100 $\mu$m is deposited on the surface) to provide a reflective surface for redirecting the incident light to the output surface. In this embodiment, the lenses 12', 14', 16', 18', 20' and 22' include, respectively, thin metal coatings 12'a, 14'a, 16'a, 18'a, 20'a, and 22'a on at least a portion of their lateral surfaces for reflecting and thereby redirecting at least a portion of the received light. In some such embodiments, the use of metal coating obviates the need to have airgaps between the lateral surfaces of adjacent lenses and hence allows those surfaces to be in contact with one another.

Those having ordinary skill in the art will appreciate that various changes can be made to the above embodiments without departing from the scope of the invention. For example, the output surface of the lens assembly (e.g., a putative surface comprising the output surface of the lenses of the lens assembly and airgaps, if any, separating the lenses) can have a shape other than circular, such as square, rectangular, elliptical, etc.

The invention claimed is:

1. An optical lens assembly, comprising
a plurality of lenses comprising a central lens and a plurality of outer lenses disposed about the central lens, said plurality of lenses being adapted to receive light from a light source, each of said lenses having an input surface configured to receive the light from the light source, an output surface through which light exits said lens, and a lateral surface extending between said input surface and said output surface;
wherein:

said central lens presents a convex input surface to incident light and each of said outer lenses presents a concave input surface to incident light;
said lenses are concentrically arranged relative to one another such that each of the lenses receives at its input surface light emitted by the source into an angular subtense different than a respective angular subtense associated with another lens;
each of said lenses guides at least a portion of the received light to its output surface via total internal reflection at the lateral surface thereof;
said optical lens assembly exhibits an aspect ratio less than about 1; and
said lenses are coupled to one another with each lens at least partially disposed in a cavity of an adjacent outer lens, each of said lenses comprises an annular shoulder or an annular recess at the output surface, the annular shoulder of at least one of said lenses is seated in the annular recess of an outer adjacent lens, and the lateral surface of each of said lenses and the lateral surface of an outer adjacent lens is separated by an airgap extending along the lateral surface thereof from the input surface to the annular shoulder or the annular recess.

2. The optical lens assembly of claim 1, wherein at least one of said lenses is configured to collimate at least a portion of the light it receives from the light source.

3. The optical lens assembly of claim 1, wherein said lenses are configured to collectively receive at least about 80% of the light emitted by said light source.

4. The optical lens assembly of claim 1, wherein said lenses are configured to collectively receive at least about 90% of the light emitted by said light source.

5. The optical lens assembly of claim 1, wherein the input surface of at least one of said lenses is configured such that the light from the light source incident thereon is substantially orthogonal thereto.

6. The optical lens assembly of claim 1, wherein at least one of said lenses exhibits a flat output surface.

7. The optical lens assembly of claim 1, wherein the plurality of lenses comprises an inner lens, a middle lens, and an outer lens.

8. The optical lens assembly of claim 7, wherein the plurality of lenses are removably and replaceably coupled to one another.

9. The optical lens assembly of claim 1, wherein each of said lenses is selectively removable and replaceable independent of the other lenses.

10. The optical lens assembly of claim 1, further comprising a lens cap configured to receive light from one or more of the output surfaces of the plurality of lenses.

11. The optical lens assembly of claim 10, wherein said lens cap comprises a textured surface.

12. The optical lens assembly of claim 10, wherein said lens cap comprises a plurality of microlenses.

13. The optical lens assembly of claim 1, further comprising a retaining ring for fixating the lenses in a defined relationship relative to one another.

14. The optical lens assembly of claim 13, wherein at least one of said lenses comprises a lateral surface configured to redirect light incident thereon via specular reflection.

15. The optical lens assembly of claim 14, wherein said lateral surface providing specular reflection is metalized.

16. The optical lens assembly of claim 15, wherein said metalized surface comprises a metal layer having a thickness in a range of about 10 micrometers to about 100 micrometers.

17. The optical lens assembly of claim 1, wherein the flat output surface of each of said lenses is orthogonal to an optical axis of the optical lens assembly.

18. The optical assembly of claim 1, wherein said lenses are arranged such that the light received by any of said lenses traverses only that lens of said plurality of lenses prior to exiting said lens assembly.

19. An optical system, comprising:
a light source;
an optical lens assembly disposed about an optical axis of the light source and optically coupled to the light source to receive light therefrom, said optical lens assembly comprising:
  a central lens having an input surface configured to receive the light from the light source and a flat output surface orthogonal to said optical axis; and
  a plurality of outer lenses disposed about the central lens, each of said outer lenses having a concave input surface configured to receive light from the light source and a flat output surface orthogonal to said optical axis through which light exits said lens;
wherein:
  the lenses of the optical lens assembly are arranged relative to one another and relative to the light source such that each lens receives light emitted by the source into a different angular subtense; and
  said lenses are coupled to one another with each lens at least partially disposed in a cavity of an adjacent outer lens, each of said lenses comprises an annular shoulder or an annular recess at the output surface, the annular shoulder of at least one of said lenses is seated in the annular recess of an outer adjacent lens, and the lateral surface of each of said lenses and the lateral surface of an outer adjacent lens is separated by an airgap extending along the lateral surface thereof from the input surface to the annular shoulder or the annular recess.

20. The optical system of claim 19, wherein the outer lenses are annulus shaped lenses that circumferentially surround the central lens at progressively increasing radial distance from the central lens.

21. The optical system of claim 19, wherein said optical lens assembly is configured to redirect at least a portion of the light received from the light source via total internal reflection.

22. The optical system of claim 21, wherein the lateral surface of at least one of said lenses is configured to reflect light incident thereon via total internal reflection.

23. The optical system of claim 19, wherein the input surface of said central lens is a convex surface adapted to collimate light it receives from the light source.

24. The optical system of claim 23, wherein the concave input surface of each of said outer lenses is configured as a section of a putative sphere centered on the light source.

25. The optical system of claim 19, wherein said lenses are removably and replaceably coupled to one another.

26. A kit, comprising
a plurality of lenses comprising a central lens and a plurality of outer lenses disposed about the central lens, said plurality of lenses being configured to removably and replaceably couple to one another to form a lens assembly having a height and an aperture diameter spanning the lens assembly, such that an aspect ratio that is a function of the height and the aperture diameter is in a range of about 0.1 to about 1, the lens assembly being configured to receive light from a light source, wherein said central lens has a convex input surface configured to receive the light from the light source and a flat output surface through which light exits said lens and each of the outer lenses has a concave input surface configured to receive the light from the light source and a flat output surface through which light exits said lens;
wherein:
  the lenses of the lens assembly are concentrically arranged relative to one another such that each of said lenses can receive at its input surface light emitted by the source into an angular subtense different from a respective angular subtense associated with another lens; and
  said lenses are coupled to one another with each lens at least partially disposed in a cavity of an adjacent outer lens, each of said lenses comprises an annular shoulder or an annular recess at the output surface, the annular shoulder of at least one of said lenses is seated in the annular recess of an outer adjacent lens, and the lateral surface of each of said lenses and the lateral surface of an outer adjacent lens is separated by an airgap extending along the lateral surface thereof from the input surface to the annular shoulder or the annular recess.

27. The kit of claim 26, wherein at least one of the lenses guides at least a portion of the received light to its output surface via total internal reflection at a lateral surface thereof extending between the input and the output surface.

* * * * *